(12) United States Patent
Lendlein et al.

(10) Patent No.: US 8,697,835 B2
(45) Date of Patent: Apr. 15, 2014

(54) METHOD FOR RESTORING AN ARTICLE COMPRISING A SHAPE MEMORY COMPOSITE MATERIAL

(75) Inventors: Andreas Lendlein, Berlin (DE); Narendra Kumar Uttamchand, Potsdam (DE); Karl Kratz, Berlin (DE); Marc Behl, Berlin (DE)

(73) Assignee: Helmholtz-Zentrum Geesthacht Zentrum für Material—und Küstenforschung GmbH, Geesthacht (DE)

( * ) Notice: Subject to any disclaimer, the term of this patent is extended or adjusted under 35 U.S.C. 154(b) by 412 days.

(21) Appl. No.: 13/092,400

(22) Filed: Apr. 22, 2011

(65) Prior Publication Data

US 2011/0258826 A1    Oct. 27, 2011

(30) Foreign Application Priority Data

Apr. 26, 2010  (DE) .......................... 10 2010 028 192

(51) Int. Cl.
*C08F 6/00* (2006.01)
(52) U.S. Cl.
USPC ............ 528/503; 264/296; 264/299; 428/212
(58) Field of Classification Search
USPC .................... 264/296, 299; 428/212; 528/503
See application file for complete search history.

(56) References Cited

U.S. PATENT DOCUMENTS

| | | | |
|---|---|---|---|
| 7,682,697 B2 * | 3/2010 | Raghavendran et al. | 428/412 |
| 2009/0283643 A1 | 11/2009 | Sar | |
| 2010/0028686 A1 | 2/2010 | Xie | |
| 2011/0258826 A1 * | 10/2011 | Lendlein et al. | 29/402.01 |

FOREIGN PATENT DOCUMENTS

| | | |
|---|---|---|
| DE | 38 26 428 A1 | 2/1990 |
| DE | 10 2007 037 063 A | 2/2009 |
| DE | 10 2007 061 342 A1 | 6/2009 |
| DE | 10 2007 061342 A1 | 6/2009 |
| WO | 99/42528 A | 8/1999 |
| WO | 99/42528 A2 | 8/1999 |

OTHER PUBLICATIONS

Bellin et al., "Polymeric Triple-Shape Materials", Proc. Nat. Acad. Sci. USA, vol. 103, No. 48: 18043-18047; Nov. 28, 2006.
Kolesov et al., "Multiple Shape-Memory Behavior and Thermal-Mechanical Properties of Peroxide Cross-linked blends of Linear and Short-Chain Branched Polyethylenes", Express Polym. Lett., vol. 2, No. 7, p. 461-473, (2008).
Pretsch, "Triple-Shape Properties of a Thermoresponsive Poly(ester urethane)", Smart Mater. Struct., vol. 19: 015006, p. 1-7, (2010).
Narendra Kumar et al., "Triple-Shape Capability of Thermo-Sensitive Nanocomposites from Multiphase Polymer Networks and Magnetic Nanoparticles", Active Polymers, Mater. Res. Soc. Symp. Proc., 2009, 1190, NN03, DOI:10.1557/PROC-1190-NN03-21.
Weigel et al., "Investigation of Parameters to Achieve Temperatures Required to Initiate the Shape-Memory Effect of Magnetic Nanocomposites by Inductive Heating", Smart Mater. Struc., vol. 18, 025011, p. 1-9, (2009).
European Search Report dated Jul. 27, 2011.

* cited by examiner

*Primary Examiner* — Terressa Boykin
(74) *Attorney, Agent, or Firm* — Norris McLauglin & Marcus P.A.

(57) ABSTRACT

A method for restoring a programmed article which contains a shape memory composite material of at least one shape memory polymer network with thermally inducible triple shape properties, the method comprising subjecting the article to a magnetic alternating field and simultaneously to an external heat supply in order to trigger the restoration, wherein at least one of the parameters of magnetic field strength (H) and ambient temperature ($T_{Umg}$) is increased continuously or discontinuously in such a way that the article first experiences a transition in shape from the first temporary shape (TF1) into the second temporary shape (TF2) and subsequently from the second temporary shape (TF2) into the permanent shape (PF).

13 Claims, 1 Drawing Sheet

METHOD FOR RESTORING AN ARTICLE COMPRISING A SHAPE MEMORY COMPOSITE MATERIAL

The invention relates to a method for restoring a programmed article which comprises, at least over portions, a shape memory composite material including a triple-shape shape memory polymer and magnetic particles embedded therein, or consists of such a material.

'Shape memory polymers' (SMPs) are known in the prior art which exhibit a transition in shape from a temporarily fixed shape (TF) into a permanent shape (PF) after a prior thermo-mechanical treatment (their 'programming') with induction by a suitable stimulus. This shape memory effect is usually stimulated thermally, i.e. the restoration driven by entropic elasticity takes place with heating of the polymer material above the defined switching temperature ($T_{SW}$), typically by increasing the ambient temperature ($T_{Umg}$). Shape memory polymers are generally polymer networks in which chemical (covalent) or physical (non-covalent) cross-linking points determine the permanent shape. The shape memory polymers, which exhibit a thermally induced shape memory effect, may be both covalent polymer networks (for example thermosets, photosets), non-covalent thermoplastic elastomers (for example multiblock copolymers such as polyester urethanes) or blends (polymer mixtures) and composites of the aforementioned classes of polymer.

Shape memory polymers are formed on a molecular level of at least one type of switching segment for fixing the temporary, programmed shape (TF) and netpoints for stabilising the original permanent shape (PF). The switching segments comprise at least one thermodynamic phase transition at an ambient temperature ($T_{trans}$), which may be, in the case of amorphous segments, a glass transition temperature ($T_{trans}=T_g$) or, with semi-crystalline segments, a melting point ($T_{trans}=T_m$). In this instance the netpoints can be of either a physical (non-covalent) nature or chemical nature (covalent cross-linkings). In shape memory polymers the switching segments are linked to one another via 'hard segments', wherein if the transition temperature of the hard segments is exceeded this leads to a physical melting and to a complete loss of shape of the polymer. The programming is typically carried out by deforming the polymer material above the transition temperature of a phase formed by the switching segment and then cooling it below this temperature whilst maintaining the deformation forces in order to fix the temporary shape. Renewed heating above the switching temperature leads to a phase transition and re-establishment of the original permanent shape (restoration). Since, in contrast to the transition temperature $T_{trans}$, the switching temperature $T_{SW}$ depends on the mechanical movement, which defines the macroscopic change in shape, the two temperatures may deviate slightly from one another.

In addition to these dual-shape polymers, which can adopt a temporary shape in addition to their permanent shape, 'triple-shape polymers' in the form of covalently cross-linked polymer networks (for example Bellin et al., Proc. Nat. Acad. Sci. USA, 2006 103 (48): 18043-18047; WO 99/42528 A; Kolesov & Radusch, Express Polym. Lett., 2008, 2, 461-473) or thermoplastic shape memory polymers (Pretsch, Smart Mater. Struct., 2010 (19): 015006) have also been described which comprise two phases formed of different switching segments and which have different transition ($T_{trans,1}$, $T_{trans,2}$) and switching temperatures ($T_{SW,1}$, $T_{SW,2}$) and are thus able to store two temporary shapes (TF1, TF2) in their 'shape memory' in addition to their permanent shape. In this instance $T_{SW,2}$ is generally at least 20 K higher than $T_{SW,1}$ in order to switch both shape transitions independently of one another. These triple-shape polymers basically comprise at least two immiscible, phase-separated (segregated) phases, in such a way that each phase can be used to fix a temporary shape. In polymer networks the permanent shape is determined by covalent cross-linking points of the polymer network, whereas the two temporary shapes are defined by a thermo-mechanical programming process and are fixed by the two switching segments. The ability to implement two successive shape transitions in a temperature-induced manner, namely from a first temporary shape (TF1) into a second temporary shape (TF2) and from there into the permanent shape (PF), enables complex movements and opens up a wide range of possibilities for application, for example within the field of medicine. The thermally induced triple shape memory effect is based on two successive heating processes of the polymer material above the defined switching temperatures ($T_{SW,1}$, $T_{SW,2}$) typically by increasing the ambient temperature ($T_{Umg,1}>T_{SW,1}$; $T_{Umg,2}>T_{SW,2}$).

Furthermore, the magnetically stimulated activation of a triple-shape transition is known for shape memory composite materials which comprise magnetic particles embedded in a triple shape polymer (DE 10 2007 037 063 A; Narendra Kumar, Kratz, Behl, Lendlein, Active Polymers, edited by A. Lendlein, V. Prasad Shastri, K. Gall, Mater. Res. Soc. Symp. proc., 2009, 1190, NNO3, DOI:10.1557/PROC-1190-NNO3-21). In these materials two shape transitions (TF1->TF2->PF) can thus be induced magnetically by two successive increases in the magnetic field strength H. In this instance the shape transition from TF1->TF2 is characterised by the first switching magnetic field strength $H_{SW,1}$ and the shape transition from TF2->PF is characterised by the second switching magnetic field strength $H_{SW,2}$, which corresponds to a successive heating process of the polymer material above the defined switching temperatures ($T_{SW,1}$ at $H_{SW,1}$ and $T_{SW,2}$ at $H_{SW,2}$). The heating achieved of the polymer material at a specific magnetic field strength is, in this instance, highly dependent on the surrounding medium (Weigel, Mohr, Lendlein, Smart Mater. Struc. 2009, 18, 025011).

A drawback of previous solutions is that a thermally induced triple shape memory effect of polymers can be triggered either by two successive increases in the ambient temperature above the switching temperatures ($R_{Umg,1}>T_{SW,1}$; $T_{Umg,2}>T_{SW,2}$) or, for shape memory composite materials which can be stimulated magnetically, by two successive increases in the magnetic field strength ($T(H_{SW,1})>T_{SW,1}$ and $T(H_{SW,2})>T_{SW,2}$) with a corresponding heating of the material. In this instance this may lead to thermal damage of surrounding materials (for example human tissue in the case of a medical application), in particular in the case of triple shape memory polymers with an upper switching temperature $T_{SW,2}>50°$ C., which requires an ambient or material temperature above the upper switching temperature $T_{SW,2}$ for the change in shape TF2->PF. A method would therefore be desirable which makes it possible, for shape memory polymer composites with triple shape properties, to recover the programmed temporary shape (TF2) or the permanent shape (PF) at moderate ambient temperatures ($T_{Umg,1}<T_{SW,1}$; $T_{Umg2}<T_{SW,2}$) or moderate magnetic field strengths.

The object of the present invention is therefore to provide a method for restoring a triple-shape polymer composite, in which at least one of the parameters required to recover TF2 or PF, comprising the ambient temperatures ($T_{Umg,1}$, $T_{Umg,2}$, referred to hereinafter as the switching ambient temperatures) or switching magnetic field strengths ($H_{SW,1}$, $H_{SW,2}$) can be influenced. Ideally, the method should also allow a variation of the difference between the two switching ambient temperatures.

This object is achieved by a method having the features of claim 1. The method according to the invention is based on the restoration of a programmed article which contains, at least over portions, a shape memory composite material, or consists completely thereof. The shape memory composite material comprises (i) at least one shape memory polymer network with thermally inducible triple shape properties which comprises at least one first phase-separated switching segment with a first transition temperature ($T_{trans,1}$) and a second phase-separated switching segment with a second transition temperature ($T_{trans,2}$, where $T_{trans,1} < T_{trans,2}$) and at least one type of covalent and/or non-covalent netpoints, and (ii) a magnetic material embedded in the shape memory polymer.

The article used in the method was previously subjected to a thermo-mechanical programming process, in such a way that it is present in a first temporary shape (TF1) and has stored in its 'shape memory' a second temporary shape (TF2) and its permanent shape (PF).

In accordance with the invention it is now provided for the article to be subjected to an external heat supply and simultaneously to a magnetic alternating field in order to trigger its restoration, wherein at least one of the parameters of magnetic field strength (H) and ambient temperature ($T_{Umg}$) being increased continuously or discontinuously in such a way that the article first experiences a transition in shape from the first temporary shape (TF1) into the (programmed) second temporary shape (TF2) (at $T_{Umg,1} < T_{SW,1}$ or $T(H_{SW,1}) < T_{SW,1}$) and subsequently from this into the permanent shape (PF) (at $T_{Umg,2} < T_{SW,2}$ or $T(H_{SW,2}) < T_{SW,2}$).

Whereas in the prior art shape memory composite materials are always restored either by external heating at $T_{Umg,1} > T_{SW,1}$; $T_{Umg,2} > T_{SW,2}$ or by application of a magnetic alternating field where $T(H_{SW,1}) > T_{SW,1}$ and $T(H_{SW,2}) > T_{SW,2}$, in accordance with the invention both heating options, namely external heating by increasing the ambient temperature and internal heating by warming the magnetic material in the magnetic field, are used in combination with one another. In this instance at least one of the parameters is varied, whereas the respective other parameter can be kept constant. The first transition in shape TF1→TF2 thus occurs at a first switching ambient temperature $T_{Umg,1}$, which is lower than the lower switching temperature ($T_{Umg,1} < T_{SW,1}$), or at a first switching magnetic field strength ($H_{SW,1}$), which is lower than a magnetic field strength ($T(H_{SW,1}) < T_{SW,1}$) which is necessary for switching in the absence of external heating. The same applies to the second transition in shape TF2→PF ($T_{Umg,2} < T_{SW,2}$ or $TH_{SW,2}) < T_{SW,2}$).

It was specifically established that, as a result of the combination according to the invention of the external and internal heating, not only a selective shifting of the switching ambient temperatures required for a change of shape is achieved, but also the difference between the two switching ambient temperatures or switching magnetic field strengths can be varied. The method in accordance with the invention can thus advantageously always be used if a change in shape at ambient temperatures lower than the switching temperatures of the shape memory polymer and/or a variation of the difference in the ambient temperatures or switching magnetic field strengths is desired, for example because the switching temperatures obtainable exclusively with external heating are so high that they are not physiologically acceptable. In this instance the method according to the invention requires no alteration of the polymer and/or composite composition, nor any variation of the programming process for fixing the temporary shapes. Instead, the produced and programmed article can be switched as needed, the switching ambient temperatures required for the change in shape only being controlled (within specific material-dependent limits) during the application. In this instance the excellent triple shape properties of the material are maintained.

Within the scope of the present invention "external heat supply" is to be understood to mean an active increase in the ambient temperature of the article to be restored, i.e. the heating of the medium surrounding the article, which medium in particular can be either gaseous (for example air) or a liquid heat carrier. As a result of the external heat supply the composite material is heated via heat exchange over its surface. By contrast, in the alternating magnetic field the embedded magnetic material is heated and heat is exchanged between the magnetic material and the polymer material, thus resulting in "internal heat supply", wherein the composite material in turn exchanges heat over its surface with the surrounding medium.

As already mentioned, at least one of the parameters of ambient temperature and/or magnetic field strength is varied during the restoration process, or else both parameters are varied. However, one of the two parameters is preferably kept constant and only the other is intensified. In this way it is possible to control the shape transitions more precisely. In accordance with a particularly preferred configuration the restoration process is carried out at a substantially constant magnetic field strength ($H < H_{SW,1}$) with a continuous or discontinuous increase in the ambient temperature ($T_{Umg}$). In this instance the ambient temperature can be increased, either continuously or in steps, starting from a temperature ($T_{Umg,low}$) below the first switching temperature ($T_{SW,1}$) up to a temperature ($T_{Umg,high}$) which preferably lies below the second switching temperature ($T_{SW,2}$). When the switching ambient temperatures ($T_{Umg,1}$, $T_{Umg,2}$) are reached, the level of which depends in particular on the accompanying magnetic field strength, the two restoration processes to TF2 and PF occur in succession.

In order to control the switching ambient temperature ($T_{Umg,1} < T_{SW,1}$; $T_{Umg,2} < T_{SW,2}$) required for the change of shape or in order to control the difference therebetween, the magnetic field strength (H) and/or the ambient temperature ($T_{Umg}$) is/are preferably predetermined as a function of the desired switching ambient temperature ($T_{Umg,1}$, $T_{Umg,2}$). In other words, the restoration parameters of magnetic field strength (H) and/or ambient temperature ($T_{Umg}$) are predetermined and applied in such a way that a change in shape is set at a desired ambient temperature ($T_{Umg}$).

In accordance with an advantageous configuration of the method according to the invention the magnetic field strength (H) and/or the ambient temperature ($T_{Umg}$) to be applied is/are predetermined mathematically as a function of a desired switching ambient temperature ($T_{Umg,1}$, $T_{Umg,2}$), at least of one of the two shape transitions TF1→TF2 and TF2→PF, using a mathematical interrelation between the magnetic field strength, ambient temperature and switching ambient temperature ($T_{Umg,1}$, $T_{Umg,2}$). Such a mathematical interrelation can be ascertained, for example empirically, by carrying out a series of tests for a shape memory composite material of given chemistry and composition, in which tests the programmed material is subjected to different magnetic field strengths and ambient temperatures, and the switching ambient temperatures ($T_{Umg,1}$, $T_{Umg,2}$) required for the changes in shape are ascertained. The mathematical interrelation between the restoration parameters H, $T_{Umg}$ and the switching ambient temperatures can thus be ascertained, for example using a manual or automatic curve adjustment method.

In accordance with an alternative configuration of the method the magnetic field strength (H) and/or the ambient temperature ($T_{Umg}$) is/are predetermined using an empirically ascertained characteristic map, containing parameter pairs of magnetic field strength (H), ambient temperature ($T_{Umg}$) and switching ambient temperature ($T_{Umg,1}$, $T_{Umg,2}$). In this instance, as described above, a series of tests are carried out and the ascertained switching ambient temperatures ($T_{Umg,1}$, $T_{Umg,2}$) necessary for the change in shape are allocated to the corresponding parameters, and the necessary parameters (H and $T_{Umg}$) are read out from the characteristic map thus obtained, which is stored in a computer-readable manner in particular, as a function of the switching ambient temperature ($T_{Umg,1}$, $T_{Umg,2}$). In this instance undefined intermediate values can be ascertained by mathematical interpolation in a known manner.

The present experiments indicate that the switching ambient temperatures ($T_{Umg,1}$, $T_{Umg,2}$) necessary for the change in shape can vary by up to approximately 25 K, but at least by up to 10 K, as a result of the combination according to the invention of external and internal heating, in particular they can in principle be lowered compared to the thermodynamic transition temperatures ($T_{trans,1}$, $T_{trans,2}$).

The shape memory polymer can be a triple-shape polymer with a shape memory effect which can be thermally stimulated, as is known in principle in the prior art. Such a polymer is able to undergo at least two shape transitions, in a temperature-induced manner, from a thermo-mechanically programmed first temporary shape TF1 into a thermo-mechanically programmed second temporary shape TF2, and from this into the permanent shape PF, which is determined in the manufacturing process. As primary molecular components, the triple-shape polymer comprises at least two phase-separated switching segments each comprising a thermodynamic transition temperature, which may be a melting point ($T_{trans}=T_m$) or a glass transition temperature ($T_{trans}=T_g$) independently of one another. In order for each segment to be adapted to fix a temporary shape, the two transition temperatures of the two segments must be different, a gap between them of at least 10 K, in particular of at least 20 K, preferably of at least 30 K being desired in order to switch the two transitions selectively and independently of one another. The switching segments can be selected, inter alia, from the group of polyesters, in particular poly(ε-caprolactone); polyethers, polyurethanes, in particular polyurethane; polyether urethanes, polyimides, polyetherimides, polyacrylates, polymethacrylates, polyvinyls, polystyrenes, polyoxymethyls and poly(para-dioxanones). In accordance with a further advantageous configuration the shape memory polymer comprises groups which can be cleaved hydrolytically or enzymatically and is thus biodegradable (resorbable), which is of particular benefit for medical applications. Suitable cleavable groups include, for example, diglycolides, dilactides, anhydrides and orthoesters. In this instance a rate of degradation can be adjusted by the amount of cleavable groups.

As a further molecular component the triple-shape polymers comprise at least one type of netpoint (cross-linking points), via which the switching segments are linked to one another and which stabilise the permanent shape. The netpoints can be of a physical (i.e. non-covalent) nature, for example are formed as a result of the dipole-dipole alternating effect or Van der Vaals forces. Within the scope of the present invention however, covalent netpoints, i.e. chemical bonds are preferred.

In accordance with an advantageous configuration the shape memory polymer comprises a physically or covalently cross-linked AB network structure, in which the switching segments (A, B) forming the switching phases are covalently bonded in the polymer network via their two chain ends. For example one of the switching segments is bonded at either end to a backbone formed of the other segment or with the cooperation thereof, the joining points defining the cross-linking points. It is also conceivable for two or more switching segments to form linear chains which are in turn cross-linked.

In accordance with an alternative configuration the shape memory polymer has a physically or covalently cross-linked side chain network structure, in which one of the switching segments (A, B) is present in the form of free side chains, which are bonded at one end to a polymer backbone formed with the cooperation of the other switching segment, whereas the other end is free.

In accordance with a further alternative configuration the shape memory polymer comprises a physically cross-linked network structure in which the switching segments forming the switching phases are each covalently bonded to different segments which each form a physically bonded polymer network, in such a way that a system with three phases is produced. Such a three-phase system can be obtained, for example, by polymer blends.

In accordance with a further configuration the shape memory polymer comprises a combination of covalent and physical cross-linking. A possible combination is, for example, covalent netpoints and two phases with physical cross-linking. Such a network can be prepared in that a precursor is introduced with the switching segments B forming the second switching phase in the presence of a pre-existing physically cross-linked polymer network, which contains the switching segments A forming the first switching phase, and is polymerised. During its formation, the second network which is formed and contains the switching segments B penetrates the existing network with the switching segments A, but not vice versa. Such a system is known as a semi-interpenetrating network (semi-IPN). Alternatively, such a network may be provided in the form of two mutually penetrating networks (interpenetrating network, IPN). An IPN can be prepared by simultaneous polymerisation of at least two types of precursor, which each form their own networks which mutually penetrate one another during polymerisation. In this instance each switching segment has its own characteristic of covalent bonding and these are chemically independent of one another, in such a way that both networks formed mutually penetrate one another.

In the covalently or physically cross-linked networks with a plurality of switching phases the triple shape property is independent of the production of the networks. The networks can be prepared, for example by polymerisation of suitable polymers, for example of acrylates and/or methacrylates. Production by polyaddition of end-group-functionalised oligomers is also possible, in particular by polyaddition of hydroxytelechelic oligomers with isocyanates to form copolyester urethane networks.

In the case of the magnetic material it comes down to its ability to interact in a magnetic alternating field in such a way that it is heated. The magnetic material can thus be heated inductively via an alternating magnetic field, in such a way that the polymer material can be heated above its switching temperature, whereby the restoration (recovery) of the shape is induced.

With regard to the magnetic material this is preferably provided in the form of particles, in particular in the form of microparticles or nanoparticles. In this instance microparticles which are present are defined by a mean particle diameter in the range of 1 to 999 m and typically lie in the range above 500 m, and nanoparticles are defined by a mean particle diameter in the range of 1 to 999 nm, typically below 10 nm. This definition thus includes a powdery consistency of the magnetic material.

With regard to material, all materials which are adapted for exhibiting interaction in an alternating magnetic field, which leads to heating of the particles, can be considered for the magnetic material. In particular the magnetic material can comprise elemental metals, for example Ni, Fe and/or Co. Alloys are also suitable, in particular Ni—Si, Fe—Pt, Ni—Pd and/or Co—Pd. Furthermore, powdery metal oxides in particular can be used as magnetic material, in particular Ni—Zn—Fe—O, Ba—Co—Fe—O and/or Fe—O. In addition, magnetites or iron oxides can be used, in which the iron atoms are replaced at least in part by Co, Ni, Mn, Zn, Mg, Cu, Cr, Cd and/or Ga. Ferrites are also suitable, in particular Ni—Zn ferrites and/or Sr ferrites. Mixtures of the aforementioned materials are also possible. Such materials which distribute homogeneously in the polymer matrix, i.e. with which a mixture which is as homogeneous as possible can be produced, are preferably used. In particular, if this behaviour is not provided the particles of the magnetic material may comprise a coating of a material which improves the miscibility with the shape memory polymer. Above all organic polymers are possible coating material.

Further preferred configurations of the invention will emerge from the other features disclosed in the dependent claims.

The invention will be described hereinafter in embodiments with reference to the accompanying drawings, in which.

The principle of the present invention will be explained hereinafter using the example of a test body (article) made of a multiphase polymer network composite material CLEG-C which contains the two semi-crystalline switching segments polyethylene glycol (PEG) and poly-ϵ-caprolactone (PCL) as well as covalent netpoints.

Production of the Shape Memory Composite Material CLEG (030)C and CLEG(040)C

CLEG-C is produced using the telechelically functionalised macromonomers poly-ϵ-caprolactone dimethacrylate (PCLDMA; $M_n$=8300 g/mol, $T_m$=55° C.) and polyethylene glycol monomethyl ether methacrylate (PEGMEMA; $M_n$=1000 g/mol, $T_m$=38° C.). The two macromonomers were in two batches mixed together with 5 wt. % and 10 wt. % nanoparticles (AdNano® MagSilica 50, Degussa AG Advanced Nanomaterials), consisting of 50-60 wt. % iron (III) oxide in a $SiO_2$ matrix and were melted. Polymerisation occurred at a temperature of 80° C. for 24 hours. Batches were produced with amounts of PCL in the polymer network of 30 and 40 wt. % based on the polymer produced in order to obtain the composites CLEG(030)C and CLEG(040)C.

The composite materials CLEG(030)C and CLEG(040)C were subjected to DSC measurements, where they displayed two considerably separate melting points at 38° C. ($T_{m,PEG}$) and at 50° C. ($T_{m,PCL}$) respectively which are practically identical to the thermal transitions of the pure multiphase polymer networks CLEG(030) and CLEG(040) (without nanoparticles).

Programming of the Shape Memory Composite Materials CLEG(030)C and CLEG(040)C

Figure 1:
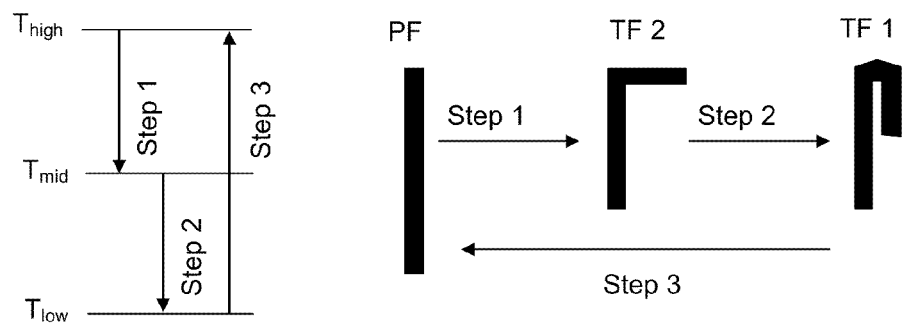
FIG. 1 is a schematic view of the programming of a strip-shaped test body formed of a triple-shape composite material.

A two-step method which is illustrated in FIG. 1 was used for the triple-shape programming of strip-shaped shaped articles made of the composite materials CLEG(030)C and CLEG(040)C.

The test body provided in its permanent shape (PF), which is dependent on the manufacturing process, was first deformed by an angle of 90° at an upper transition temperature ($T_{high}$) of 70° C., i.e. above the melting points of PCL and PEG, in the completely amorphous state and was cooled to an intermediate temperature ($T_{mid}$) of 40° C., i.e. below $T_{m,PCL}$ but above $T_{m,PEG}$, whilst maintaining the shape constraint, the second temporary shape (TF2) being fixed (step 1 in FIG. 1).

At $T_{mid}$=40° C. the test body was then deformed by a further 90° to a total of 180° and the first temporary shape (TF1) was fixed by cooling to a lower temperature ($T_{low}$) of 0° C., i.e. below $T_{m,PEG}$ (step 2 in FIG. 1).

After this procedure the article was present in a first temporary shape (TF1) and had stored the second temporary shape (TF2) and its permanent shape (PF) in its 'shape memory'.

Restoration (Recovery)

The test bodies programmed by the method described above were placed in an incubator developed specifically for this purpose. The incubator comprised a housing of which the temperature could be controlled by a thermostat and which had a test sample holder on which a digital camera was positioned in order to monitor and record the change in shape of the test body. With the aid of a pyrometer the surface temperature of the article could be detected using infrared radiation. Furthermore, an inductor coil connected to an oscillator was arranged in the housing in order to generate a magnetic alternating field. A thermocouple made it possible to measure the ambient temperature inside the housing.

Figure 2A:
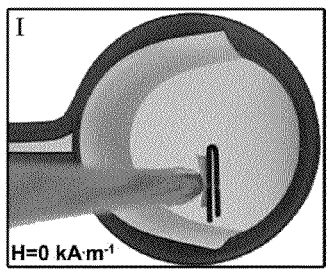
FIG. 2A is a photograph showing the restoration of a strip-shaped test body made of the triple-shape composite material CLEG30C with 5 wt.% nanoparticles at a first magnetic field strength and constant ambient temperature.
Figure 2B:
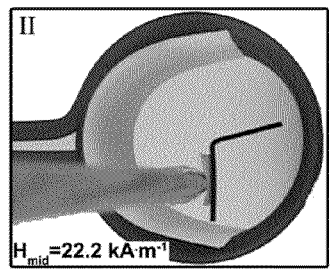
FIG. 2B is a photograph as for FIG. 2A, at a second magnetic field strength.
Figure 2C:
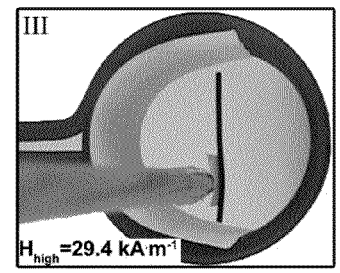
FIG. 2C is a photograph as for FIG. 2B, at a third magnetic field strength.

FIG. 2 shows a series of photos which illustrate the restoration process of a programmed test body made of CLEG (030)C with 5 wt. % nanoparticles at different magnetic field strengths without additional heating ($T_{Umg}$=RT=constant). In this instance a magnetic field strength of $H_{mid}$=22.2 kA/m corresponded to a surface temperature of the test body of 40° C., which is necessary for switching the PEG segment, i.e. for triggering the transition in shape from TF1 to TF2 (FIG. 2-II), and a magnetic field strength of $H_{high}$=29.4 kA/m corresponded to a surface temperature of the test body of 70° C., which is necessary for switching the PCL segment, i.e. for triggering the transition in shape from TF2 to PF (FIG. 2-III). A similar measurement with CLEG(040)C yielded practically identical results ($H_{mid}$=22.4 kA/m, $H_{high}$=29.4 kA/m).

The shape restoration according to the present invention was carried out on test bodies programmed in accordance with FIG. 1 and made of CLEG(040)C with 5 wt. % nanoparticles by raising the ambient temperature (air), in a linear manner and at a constant magnetic field strength H, with the aid of the thermostat from a temperature below the switching temperature of PEG to a temperature above the switching temperature of PCL, in this specific case from 25° C. to 57° C.

with a heating rate of approximately 1 K/min. The test was carried out at four magnetic field strengths ($H_1=0$ kA/m; $H_2=18.2$ kA/m; $H_3=20.2$ kA/m and $H_4=24.2$ kA/m). In order to quantify the restoration the angle of restoration of the test body was ascertained from the images recorded as a function of the surface temperature.

Figure 3:
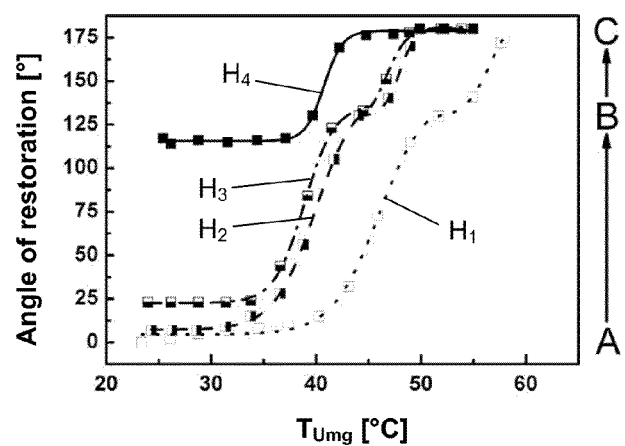
FIG. 3 shows the restoration curves of a CLEG40C test body with 5 wt. % nanoparticles during continuous heating thereof at different constant magnetic field strengths.

FIG. 3 shows the diagrams thus obtained (angle of restoration vs. temperature) for the four magnetic field strengths. It can be seen that at the highest magnetic field strength of 24.2 kA/m the PEG segment spontaneously switches without external heating, i.e. that the test body is already in its second temporary shape TF2 at the starting temperature of 25° C. The switching ambient temperatures ($T_{Umg,1} < T_{SW1,PEG}$ and $T_{Umg,2} < T_{SW2,PCL}$) were determined from the inflection points of the restoration diagrams. These and their difference are summarised in the table below. The data show that a shift of the switching ambient temperature $T_{Umg,1}$, which is associated with the PEG segments, from 46° C. (where $H_1=0$ kA/m) to temperatures below 25° C. (where $H_4=24.2$ kA/m) could be achieved. For the PCL switching phase it was possible to lower the switching ambient temperature $T_{Umg,2}$ from 57° C. (where $H_1=0$ kA/m) to 41° C. (where $H_2=24.2$ kA/m).

TABLE

| Test body % nanoparticles | H [kA/m] | $T_{Umg,1}$ [° C.] | $T_{Umg,2}$ [° C.] | $\Delta(T_{Umg,2} - T_{Umg,1})$ [° C.] |
|---|---|---|---|---|
| CLEG40 5% | 0 | 46 | 57 | 11 |
| CLEG40 5% | 18.2 | 40 | 48 | 8 |
| CLEG40 5% | 20.2 | 39 | 47 | 8 |
| CLEG40 5% | 24.2 | <25 | 41 | 13 |

The invention claimed is:

1. A method for restoring a programmed article which contains, at least over portions, a shape memory composite material, said composite material comprising
  (i) at least one shape memory polymer network with thermally inducible triple shape properties which comprises at least a first phase-separated switching segment with a first transition temperature ($T_{trans,1}$) and a second phase-separated switching segment with a second transition temperature ($T_{trans,2}$, where $T_{trans,1} < T_{trans,2}$) and at least one type of covalent and non-covalent netpoints, and
  ii) a magnetic material embedded in the shape memory polymer, wherein, after a thermo-mechanical programming process, the article is present in a first temporary shape (TF1) and having stored a second temporary shape (TF2) and a permanent shape (PF), the method comprising:
  subjecting the article to a magnetic alternating field and simultaneously to an external heat supply in order to trigger the restoration, wherein at least one of the parameters of magnetic field strength (H) and ambient temperature ($T_{Umg}$) is increased continuously or discontinuously in such a way that the article first experiences a transition in shape from the first temporary shape (TF1) into the second temporary shape (TF2) and subsequently from the second temporary shape (TF2) into the permanent shape (PF).

2. The method according to claim 1, wherein at least one of the magnetic field strength (H) and the ambient temperature ($T_{Umg}$) is predetermined as a function of a desired switching ambient temperature ($T_{Umg,1}$, $T_{Umg,2}$), which is necessary for the change of shape, of the first and/or second switching segment.

3. The method according to claim 2, wherein at least one of the magnetic field strength (H) and the ambient temperature ($T_{Umg}$) is predetermined using an empirically ascertained characteristic map.

4. The method according to claim 2, wherein at least one of the magnetic field strength (H) and the ambient temperature ($T_{Umg}$) is mare predetermined mathematically using a mathematical interrelation.

5. The method according to claim 1, wherein the restoration process is carried out at a substantially constant magnetic field strength (H) with a continuous or discontinuous increase in the ambient temperature ($T_{Umg}$).

6. The method according to claim 5, wherein at a substantially constant magnetic field strength (H) the ambient temperature ($T_{Umg}$) is increased, either continuously or in steps, starting from a temperature ($T_{Umg,low}$) below a lower switching temperature ($T_{sw,1}$) up to a temperature ($T_{Umg,high}$), the temperature ($T_{Umg,high}$) in particular lying below an upper switching temperature ($T_{sw,2}$).

7. The method according to claim 1, wherein the switching segments are selected from the group of polyesters, polyethers, polyurethanes, polyether urethanes, polyimides, polyetherimides, polyacrylates, polymethacrylates, polyvinyls, polystyrenes, polyoxymethyls and poly(para-dioxanones).

8. The method according to claim 1, wherein the switching segments comprise groups which can be cleaved hydrolytically and/or enzymatically.

9. The method according to claim 1, wherein the magnetic material is present in the form of particles.

10. The method according to claim 1, wherein the magnetic material is a component selected from the group comprising metals, alloys, in particular Ni—Si, Fe—Pt, Ni—Pd and Co—Pd, metal oxides, in particular Ni—Zn—Fe—O, Ba—Co—Fe—O and Fe—O; magnetites or iron oxides in which the iron atoms are replaced in part by Co, Ni, Mn, Zn, Mg, Cu, Cr, Cd and/or Ga; ferrites, in particular Ni—Zn ferrites and Sr ferrites.

11. The method according to claim 10, wherein the metals are selected from Ni, Fe and Co, the alloys are selethe metal oxides, in particular Ni—Zn—Fe—O, Ba—Co—Fe—O and Fe—O; magnetites or iron oxides in which the iron atoms are replaced in part by Co, Ni, Mn, Zn, Mg, Cu, Cr, Cd and/or Ga; ferrites, in particular Ni—Zn ferrites and Sr ferrites.

12. The method according to claim 8, wherein the hydrolytically and/or enzymatically cleavable groups are selected in particular from the group of diglycolides, dilactides, anhydrides and orthoesters.

13. The method according to claim 9, wherein the magnetic material is present in the form of microparticles with a mean particle diameter in the range of 1 to 999 μm, or in the form of nanoparticles with a mean particle diameter in the range of 1 to 999 nm.

* * * * *